(12) United States Patent
Amit et al.

(10) Patent No.: US 10,834,255 B1
(45) Date of Patent: Nov. 10, 2020

(54) TARGET INJECTION SAFE METHOD FOR INLINING LARGE CALL TABLES

(71) Applicant: VMware, Inc., Palo Alto, CA (US)

(72) Inventors: Nadav Amit, Mountain View, CA (US); Frederick Joseph Jacobs, Los Gatos, CA (US); Michael Wei, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/748,734

(22) Filed: Jan. 21, 2020

Related U.S. Application Data

(60) Provisional application No. 62/871,573, filed on Jul. 8, 2019.

(51) Int. Cl.
*H04M 1/64* (2006.01)
*H04M 3/42* (2006.01)
*H04M 3/523* (2006.01)
*H04M 3/51* (2006.01)

(52) U.S. Cl.
CPC ... *H04M 3/42221* (2013.01); *H04M 3/42059* (2013.01); *H04M 3/5175* (2013.01); *H04M 3/5191* (2013.01); *H04M 3/523* (2013.01)

(58) Field of Classification Search
CPC ......... H04M 3/42221; H04M 3/42059; H04M 3/5175; H04M 3/5191
See application file for complete search history.

(56) References Cited

U.S. PATENT DOCUMENTS

| | | | |
|---|---|---|---|
| 5,956,758 A | 9/1999 | Henzinger et al. | |
| 6,763,104 B1 * | 7/2004 | Judkins | H04M 3/5233 379/265.09 |
| 8,312,249 B1 | 11/2012 | Trumbull | |
| 8,340,262 B1 * | 12/2012 | Cermak | H04M 3/42314 379/201.01 |
| 8,406,384 B1 * | 3/2013 | Tremblay | H04M 3/4936 379/88.05 |
| 8,578,355 B1 | 11/2013 | Mars et al. | |
| 10,698,668 B1 | 6/2020 | Pohlack et al. | |
| 2004/0049667 A1 | 3/2004 | McCormick et al. | |

(Continued)

OTHER PUBLICATIONS

Ayers et al., "Aggressive Inlining", PLDI '97 Proceedings of the ACM SIGPLAN 1997 conference on Programming language design and implementation, ACM SIGPLAN Notices, vol. 32, Issue 5, May 1997, pp. 134-145.

(Continued)

*Primary Examiner* — Simon King
(74) *Attorney, Agent, or Firm* — Kim & Stewart LLP

(57) ABSTRACT

A method redirecting an indirect call in a call table to direct call includes the steps of: recording frequencies of calls in a frequency table; updating a search trampoline to cache, as direct calls, calls of the call table that are most frequently made according to the recorded calls in the frequency table; receiving a request to perform one of the calls in the call table; performing a search of the search trampoline to determine whether or not the requested call is cached in the search trampoline; if the requested call is cached in the search trampoline, performing the requested call that is cached in the search trampoline; and if the requested call is not cached in the search trampoline, performing the requested call by accessing the call via the call table.

20 Claims, 12 Drawing Sheets

(56) References Cited

U.S. PATENT DOCUMENTS

| | | | |
|---|---|---|---|
| 2005/0010804 A1 | 1/2005 | Bruening et al. | |
| 2005/0032527 A1* | 2/2005 | Sheha | H04W 4/029 |
| | | | 455/456.1 |
| 2010/0039495 A1* | 2/2010 | Rahman | H04M 3/4931 |
| | | | 348/14.08 |
| 2012/0271615 A1 | 10/2012 | North | |
| 2013/0024675 A1 | 1/2013 | Lovett et al. | |
| 2013/0036464 A1 | 2/2013 | Glew et al. | |
| 2013/0044869 A1* | 2/2013 | Citron | H04M 15/06 |
| | | | 379/93.23 |
| 2013/0166886 A1 | 6/2013 | Sasanka et al. | |
| 2015/0054910 A1* | 2/2015 | Offen | H04M 3/20 |
| | | | 348/14.02 |
| 2018/0060209 A1 | 3/2018 | Kim et al. | |
| 2020/0026519 A1 | 1/2020 | Sultana et al. | |
| 2020/0192668 A1 | 6/2020 | Newton et al. | |

OTHER PUBLICATIONS

Ivan Baev "Profile-based Indirect Call Promotion", LLVM Developers Meeting, Oct. 2015, 19 pages. https://llvm.org/devmtg/2015-10/slides/Baev-IndirectCallPromotion.pdf.

Calder et al., "Reducing Indirect Function Call Overhead in C++ Programs", POPL 94 Proceedings of the 21st ACM SIGPLAN-SIGACT Symposium on Principles of Programming Languages, Jan. 1994, pp. 397-408.

Chen et al., "AutoFDO: Automatic Feedback-Directed Optimization for Warehouse-Scale Applications", CGO '16 Proceedings of the 2016 International Symposium on Code Generation and Optimization, ACM, Mar. 2016, pp. 12-23.

Jonathan Corbet, "Finding Spectre vulnerabilities with smatch", LWN.net, Apr. 20, 2018, 6 pages. https://lwn.net/Articles/752408/.

Intel Corporation, "Intel Analysis of Speculative Execution Side Channels", White Paper, Jan. 2018, 12 pages. https://newsroom.intel.com/wp-content/uploads/sites/11/2018/01/Intel-Analysis-of-Speculative-Execution-Side-Channels.pdf.

Intel Corporation. "Retpoline: A Branch Target Injection Mitigation", White Paper, Jun. 2018, 22 pages. https://software.intel.com/security-software-guidance/api-app/sites/default/files/Retpoline-A-Branch-Target-Injection-Mitigation.pdfsource=techstories.org.

Intel Corporation. "Speculative Execution Side Channel Mitigations", White Paper, May 2018, 23 pages. https://software.intel.com/security-software-guidance/api-app/sites/default/files/336996-Speculative-Execution-Side-Channel-Mitigations.pdf.

Holzle et al,. "Optimizing Dynamically-Dispatched Calls with Run-Time Type Feedback", PLDI 94 Proceedings of the ACM SIGPLAN 1994 Conference on Programming Language Design and Implementation, ACM SIGPLAN Notices, vol. 29, Issue 6, Jun. 1994, pp. 326-336.

Andi Kleen, "Add a text_poke syscall", LWN.net, Nov. 2013, 7 pages. https://lwn.net/Articles/574309/.

Koruyeh et al., "Spectre Returns! Speculation Attacks using the Return Stack Buffer", WOOT18 Proceedings of the 12th Usenix Conference on Offensive Technologies, USENIX, Aug. 2018, pp. 1-12.

Microsoft, "Mitigating speculative execution side channel hardware vulnerabilities", Microsoft Security Response Center, Mar. 15, 2018, 14 pages. https://msrc-blog.microsoft.com/2018/03/15/mitigating-speculative-execution-side-channel-hardware-vulnerabilities/.

Martin Giles, "At Least Three Billion Computer Chips Have the Spectre Security Hole", MIT Technology Review, Jan. 2018, 16 pages. https://www.technologyreview.com/s/609891/at-least-3-billion-computer-chips-have-the-spectre-security-hole/.

Josh Poimboeuf, "[Patch v2 0/4] Static calls", Linux Kernel Mailing List, Nov. 2018, 2 pages. https://lkml.org/lkml/2018/11/26/951.

Ryan Smith, "Intel Publishes Spectre Meltdown Hardware Plans: Fixed Gear Later This Year", AnandTech, Mar. 2018, 6 pages. https://www.anandtech.com/show/12533/intel-spectre-meltdown.

Paul Turner, "Retpoline: a software construct for preventing branch-target-injection", Google, 2019, 8 pages. https://support.google.com/faqs/answer/7625886.

David Woodhouse. "[Patch] x86/retpoline: Fill RSB on context switch for affected CPUs", Linux Kernel Mailing List, Jan. 2018, 3 pages. https://lkml.org/lkml/2018/1/12/552.

David Woodhouse, "[4.4, 13/53] x86/retpoline/entry: Convert entry assembler indirect jumps", Linux Kernel Mailing List, Jan. 2018, 4 pages. https://lore.kernel.org/patchwork/patch/876057/.

Robert L. Bernstein, "Producing Good Code for the Case Statement", Software: Practice and Experience, vol. 15(10), Oct. 1985, pp. 1021-1024.

* cited by examiner

TARGET INJECTION SAFE METHOD FOR INLINING LARGE CALL TABLES

CROSS-REFERENCE TO RELATED APPLICATION(S)

This application claims the benefit of U.S. Provisional Application No. 62/871,573, filed Jul. 8, 2019, which is incorporated by reference herein.

BACKGROUND

Modern microprocessors that perform branch predictions have been found to have security vulnerabilities due to their use of speculative execution. FIG. 1A depicts an example computer system 100 whose CPUs 118a-n may have these vulnerabilities and FIG. 1B depicts the architecture of CPUs 118a-n in more detail. Features of the architecture that give rise to the vulnerability are described in reference to FIG. 1B.

Referring to FIG. 1A, computer system 100 includes a user space 102 in which one or more user processes 104a-n run, each with one or more threads 106a-n, an operating system kernel 108 that may include one or more kernel processes 110a-n with threads 112a-n and a set of page tables 114 that map virtual address spaces of the user processes to physical memory. Operating system kernel 108 operates on behalf of the one or more user processes 104a-n by receiving system calls via a system call interface 111. Hardware 116 includes one or more CPUs 118a-n, RAM 124 in which programs and data can be stored and persistent storage 126 such as hard disk drives or solid-state drives.

Each CPU 118a-n includes a cache 128, 130, which may include a first level, second level and optionally, a third level cache. Each CPU 118a-n may also include one or more processing cores 120a-n, 122a-n. CPUs 118a-n are usually superscalar (i.e., multi-issue) and deeply-pipelined.

Referring to FIG. 1B, major sections of vulnerable CPUs 118a-n include a bus unit 152 which is connected to a system bus 150, a 1st level cache 154, a 2nd level cache 156 and an optional 3rd level cache 158, a front end section 160, an out-of-order execution core 162, a retirement unit 164, a set of general-purpose registers 168, and a branch target buffer (BTB) and branch prediction unit 166.

Front-end section 160 includes fetch and decode logic 170 and an execution trace cache 172. Fetch and decode logic 170 pre-fetches instructions that are likely to be executed, fetches instructions that have not already been prefetched, decodes instructions into micro-operations (micro-ops) and stores the decoded instructions into an execution trace cache 172. Assisting execution trace cache 172 and fetch and decode logic 170 are BTBs and branch prediction hardware unit 166. Branch targets are predicted by CPUs 118a-n based on their linear addresses using the branch target buffers (BTBs).

Out-of-order execution core 162 employs dynamic execution, which incorporates three functions, (1) branch prediction, (2) detection of instructions that can be executed out-of-order, and (3) speculative execution of instructions. Speculative execution refers to the CPU's ability to execute instructions that lie beyond a conditional branch or an indirect call that has not been resolved. Executing instructions that lie beyond a conditional branch helps to keep the pipeline full and, if successful, improves the performance of CPUs 118a-n.

Retirement unit 164 receives results of the executed micro-ops from out-of-order execution core 162 and searches for completed instructions that have no data dependencies or unresolved branch predictions. When found, retirement unit 164 commits the results of these instructions to memory or general-purpose registers 168 in the order in which they were originally issued. Retirement unit 164 also keeps track of branches and sends updated branch target information to the BTBs in unit 166, which in turn assists fetch/decode logic 170.

However, the speculative execution of instructions mentioned above has side effects that can reveal private data to attackers if the speculative execution is incorrect, and the processor undoes the speculation. For example, if the pattern of memory accesses performed by such speculative execution depends on private data, the resulting state of data in 1st level cache 154 constitutes a side channel through which the attacker may be able to extract information about the private data using a timing attack, which attempts to discern the private data based on the timing of certain processing steps. Attacks of this type are called Spectre Variant 2.

To counter this type of attack, a code sequence called a 'retpoline' is employed in an operating system kernel 108, such as the Linux® kernel.

FIG. 2 depicts a flow of operation for a call to a retpoline. The retpoline code replaces a 'call % rax', which is an indirect call to the location that is computed and stored in the % rax register. In step 202, the retpoline code determines whether the contents of % rax are known (i.e., computed). If not, then a CPU 118a-n executes a 'pause' instruction in step 204 and an 'lfence' (load fence) instruction in step 206. The 'pause' instruction is used to release processor resources to a hardware simultaneous multithread (SMT) or to save power if no execution is needed. The 'lfence' instruction guarantees ordering between two loads and prevents speculative loads from passing the lfence.

When the contents of the % rax register become known, then CPU 118a-n pushes the contents of % rax onto the stack in step 208 and then executes a return in step 210 to the location that the top of the stack points to. Thus, the 'call % rax' instruction is converted into a return (ref) instruction to the location specified by % rax. The conversion from an indirect call instruction to a return instruction helps to counter a Spectre, Variant 2 type attack because the return uses a return stack buffer (RSB) instead of the BTB, which is thought to be vulnerable to the attack.

Although the retpoline defends against the Spectre, Variant 2 type attack, the retpoline may still be exposed to an attack, because in some cases, if the RSB is empty, the processor may use the BTB instead.

Other mitigation measures in new hardware or microcode can be employed. However, these mitigation measures only work when operating system kernel 108 runs on the new CPU hardware or microcode. If operating system kernel 108 is moved to older hardware (i.e., hardware or microcode lacking the mitigation measures), the mitigation measures in hardware or microcode are of no use.

Another mitigation technique is call promotion, in which an indirect call is promoted to a conditional direct call.

FIG. 3 depicts a flow of operations for promoting the indirect call. In step 302, CPU 118a-n compares the target address to the contents of the % eax register. If the result is zero, as determined in step 304, CPU 118a-n calls the target address directly in step 306. If the result is not zero, as determined in step 304, CPU 118a-n performs the indirect call on the % eax register in step 308.

While promoting indirect calls reduces the chance that a processor will miss-speculate an indirect call, the promotion is costly because code size is increased and performance is reduced if infrequently used target addresses are promoted. Other limitations include: being allowed only a limited number of target addresses to promote; and being unable to predict accurately the target addresses that should be promoted because likely target addresses are determined at compile time or through the use of a profiling tool that observes an instance of a kernel that may not be representative of a later released or modified kernel. Finally, the target addresses learned by a profiling tool requires recompiling operating system kernel 108 to include them. As kernels are distributed in binary form, recompiling operating system kernel 108 is not practical.

Even binary translators or just-in-time (JIT) compilers do not adequately address Spectre Variant 2 type attacks, especially in regard to execution of an operating system kernel.

Thus, retpolines and indirect call promotion both defend against Spectre, Variant 2 type attacks, but at a high cost. The retpolines approach comes at a high performance cost because the retpoline prevents speculative execution until the branch target address of the indirect call is determined. Call promotion comes at a high performance cost because code size is increased and because promotion occurs without regard to the dynamic behavior of the kernel leading to promotions of infrequently used target addresses.

Thus, it is desirable to have a solution to mitigate attacks, such as Spectre, Variant 2 type, of indirect calls but without defeating speculative execution and thus maintaining performance.

SUMMARY

A method redirecting an indirect call in a call table to direct call, according to an embodiment, includes the steps of: recording frequencies of calls in a frequency table; updating a search trampoline to cache, as direct calls, calls of the call table that are most frequently made according to the recorded calls in the frequency table; receiving a request to perform one of the calls in the call table; performing a search of the search trampoline to determine whether or not the requested call is cached in the search trampoline; if the requested call is cached in the search trampoline, performing the requested call that is cached in the search trampoline; and if the requested call is not cached in the search trampoline, performing the requested call by accessing the call via the call table.

Further embodiments include a computer system configured to carry out one or more aspects of the above method, and a non-transitory computer-readable storage medium containing computer-readable code executable by one or more computer processors to carry out one or more aspects of the above method.

DETAILED DESCRIPTION

One or more embodiments described below provide "jump switches," which avoid the problems with both retpolines and indirect promotion and other mitigation measures. Jump switches are code fragments, which serve as trampolines for indirect calls, and trampolines are code fragments that redirect the CPU to a different code path. Jump switches are Spectre-aware in that if a jump switch cannot promote an indirect call, then the jump switch falls back to a mitigated indirect call, such as a retpoline or hardware or microcode that provides protection.

Embodiments of jump switches include a search jump switch (SJS) and an instance jump switch (NJS).

In many parts of an operating system, such as the Linux operating system, call tables are used to select a handler in the operating system for handling a request. To access the handler, a requester provides an integer, and a dispatcher routine adds this integer to the base of the call table to arrive at an entry that holds the address of the requested handler function. For example, Linux uses a call table, known as sys_call_table, which holds a set of function pointers (addresses) to handler routines, to find a handler for a system call by a user space program. If a user-space program invokes the open system call, the integer passed is 5. The dispatcher routine then adds 5 to the sys_call_table base address and arrives at the fifth entry that holds the address of the handler function (which, in Linux, is sys_open). After parameter values for the call have been copied onto the stack, the kernel makes an indirect call to the handler routine and switches to the system call handling. Because the handler is accessed by an indirect call, it is desirable to replace the indirect call with a direct call. A search jump switch (SJS) is used to replace the indirect call with a direct call.

According to the embodiments, the SJS is used to implement a direct call for a system call table. In this case, the SJS acts as a cache of the system call table for the most frequent call translations (i.e., from a system call number to a call handler) with the system call table itself as the fallback case when there is a cache miss. To implement the SJS in an operating system, the system call dispatching source code of the operating system kernel is modified.

Figure 1A:
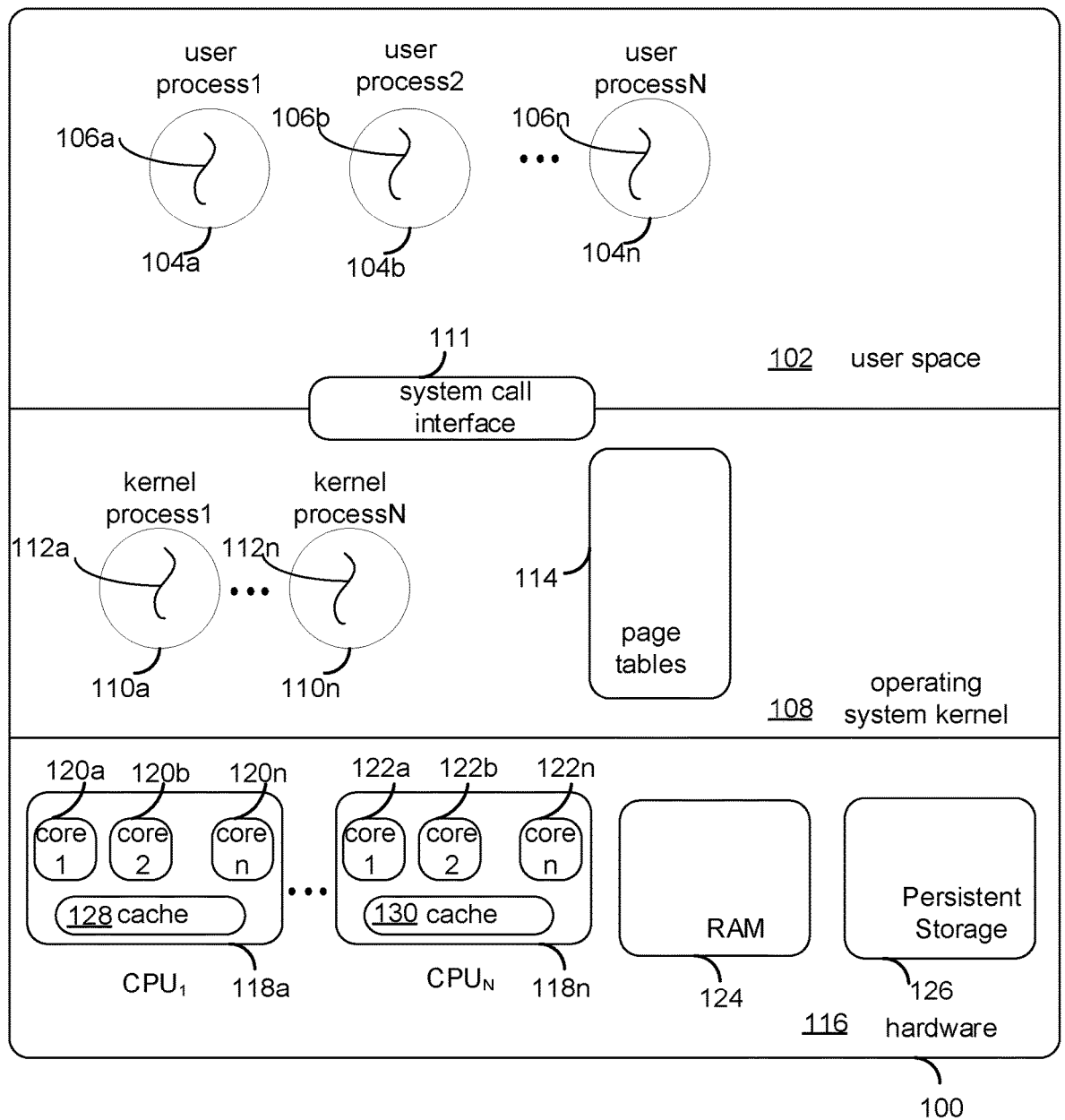
FIG. 1A depicts an example system whose CPUs may have these vulnerabilities.
Figure 1B:
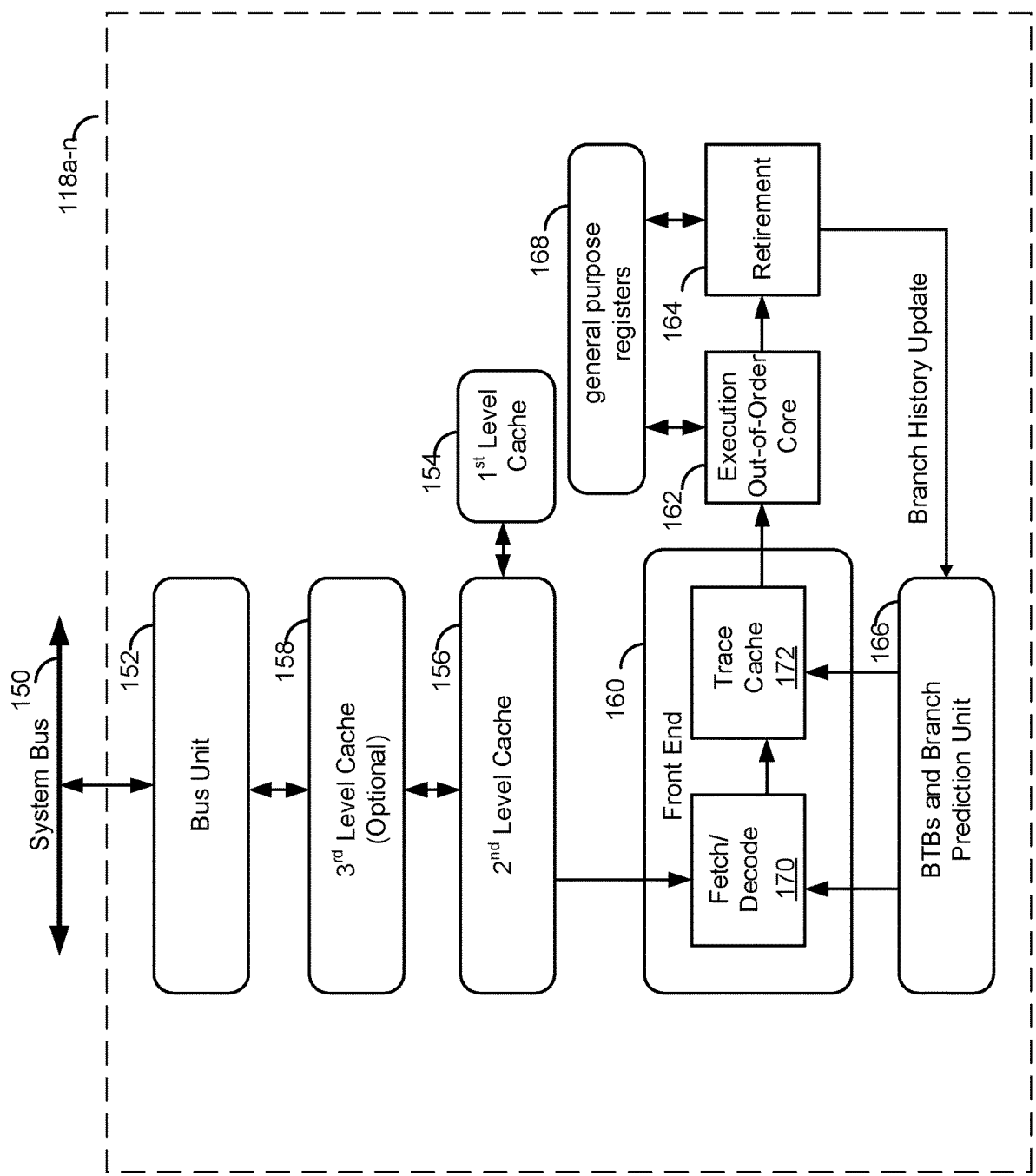
FIG. 1B depicts the architecture of the CPUs in more detail.
Figure 2:
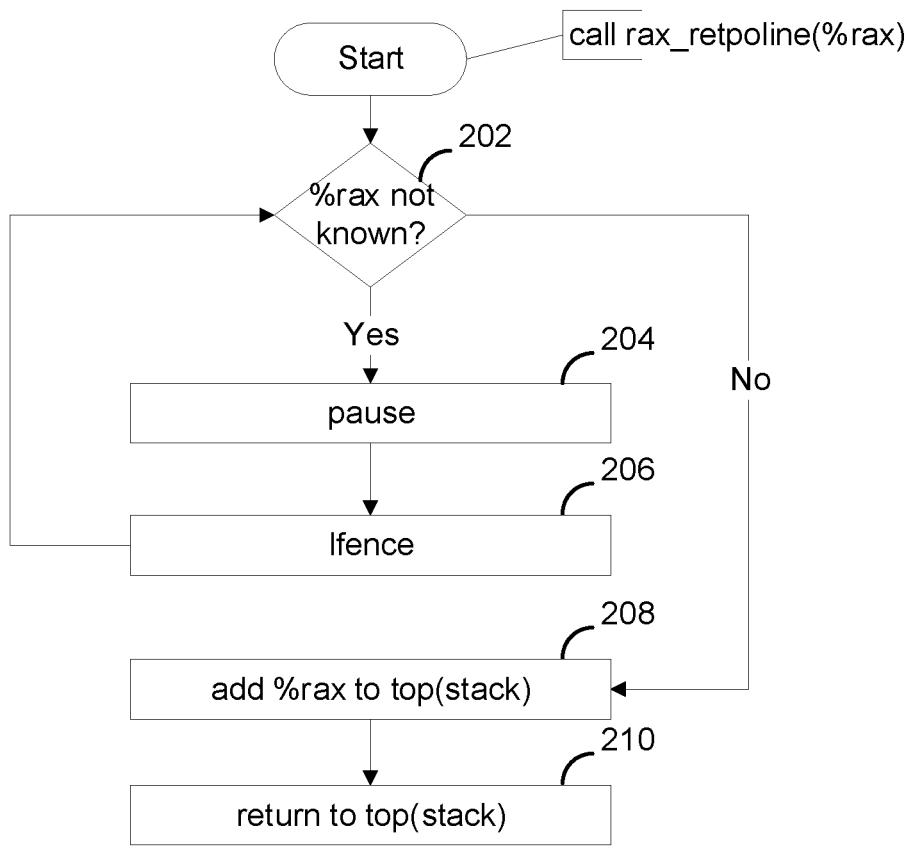
FIG. 2 depicts a flow of operations for a call to a retpoline.
Figure 3:
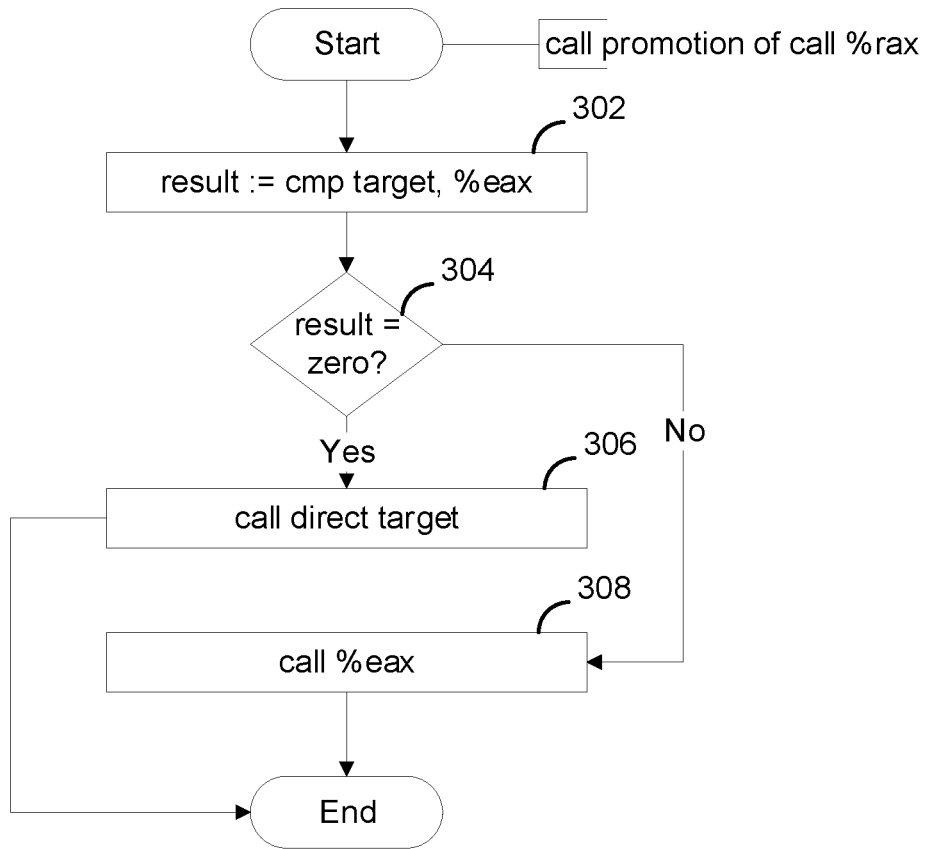
FIG. 3 depicts a flow of operations for indirect call promotion.
Figure 4A:
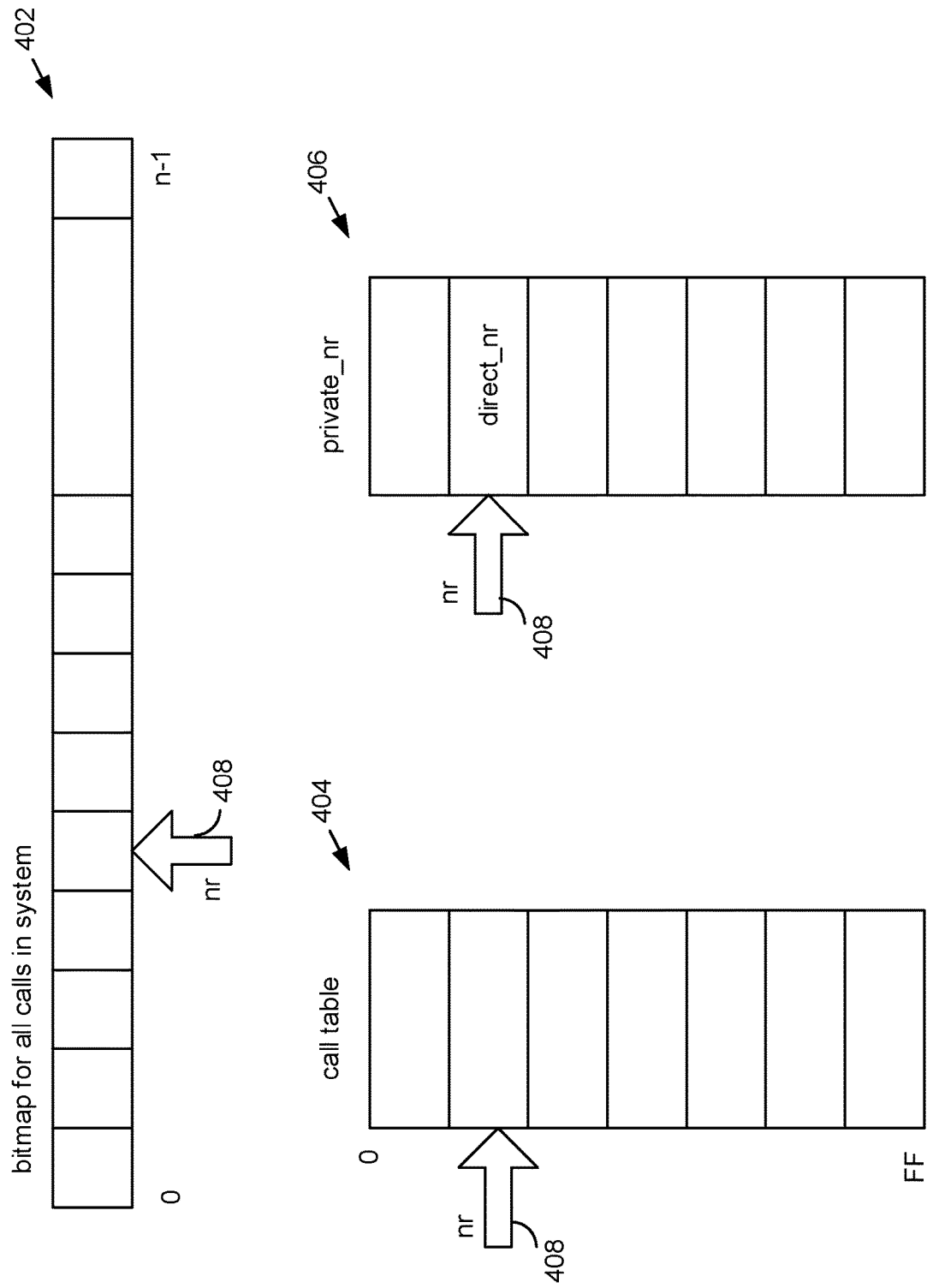
FIG. 4A depicts a bit map, a call table and a private_nr table, in an embodiment of a search jump switch (SJS).

FIG. 4A depicts a bit map, a call table and a private_nr table, used in an embodiment of an SJS. In the figure, bit map 402 contains a bit for each possible system call, of which there may be many hundreds. Bit map 402 is indexed by a pointer 408 called nr. The call table 404, e.g., the sys_call_table of the Linux OS, is a list of system calls which is also indexed by the pointer 408. Private_nr table 406 is a list that contains an integer code, direct_nr, indicating the particular system call is implemented as an SJS.

Figure 4B:
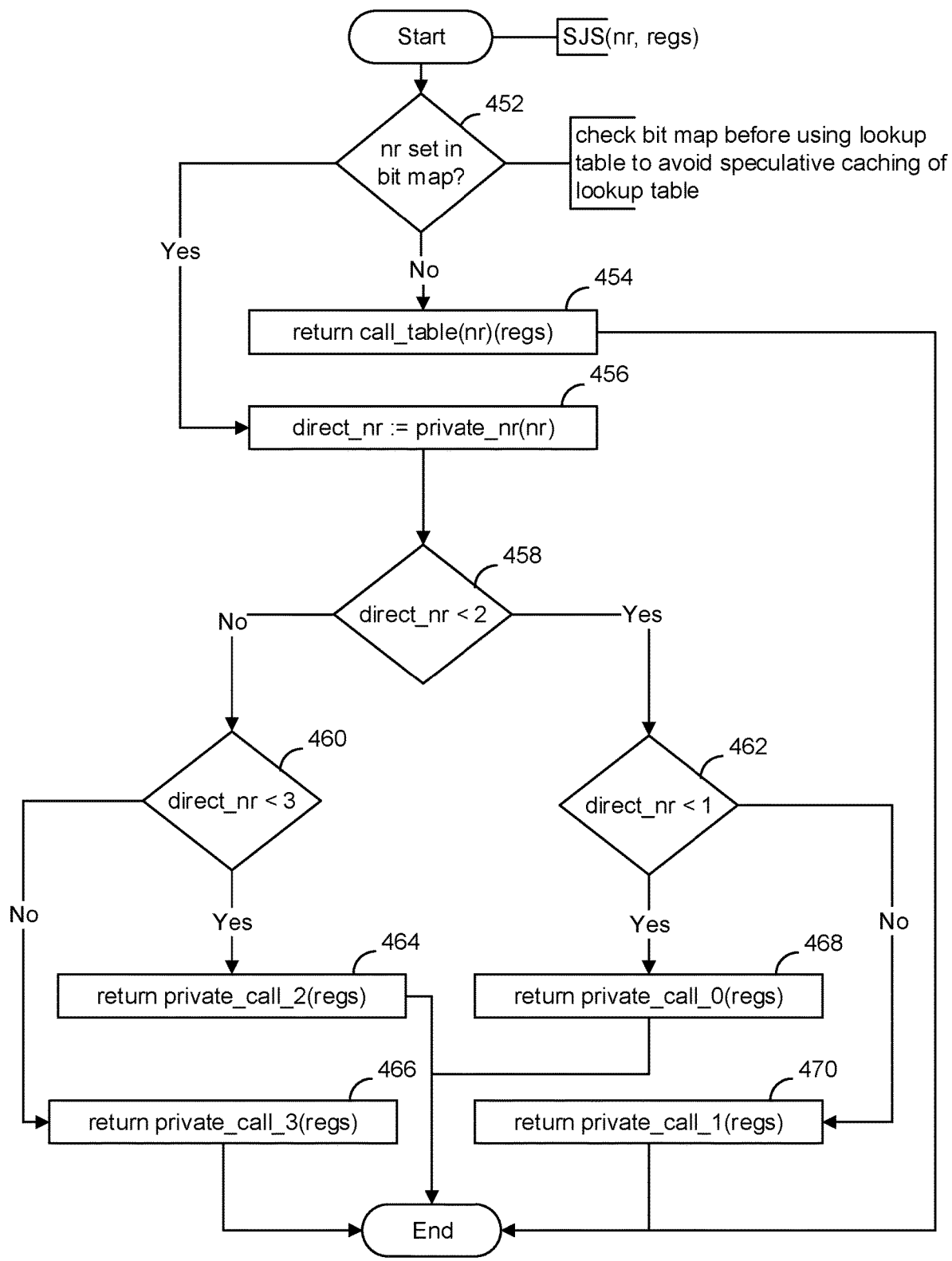
FIG. 4B depicts a flow of operations for an SJS, in an embodiment.

FIG. 4B depicts a flow of operations for a search jump switch, in an embodiment. In step 452, the search jump switch (SJS) determines whether bit map 402 has a bit set for nr index 408 to call table 404. If not, then in step 454, the system call is obtained from call table 404. If it is determined, in step 452, that bit map 402 has a bit set for index nr 408, then the system call is implemented as an SJS. In step 456, the SJS looks up in private_nr table 406 the direct_nr for the system call that is implemented as an SJS. The code, direct_nr, is then decoded by the series of decisions, steps 458, 460, 462 that constitute a binary search to find the direct call in the SJS. In step 458, the direct_nr value is tested to determine if it is less than 2. If so, the SJS then proceeds to step 462 to determine if the direct_nr value is less than 1. If the direct_nr value is less than 1, then the private_call_0 (regs) is executed in step 468, where private_call_0(regs) is a direct call instead of an indirect call and thus not vulnerable to attacks on speculative execution. If the value of direct_nr is greater than 1 as determined in step 462, then private_call_1(regs) is executed in step 470. If the value of direct_nr is not less than 2, then the SJS proceeds to step 460, which determines whether or not the value of direct_nr is less than or not less than 3. If the value of direct_nr is less than 3, then the private_call_2(regs) is executed in step 464. If not less than 3, then the private_call_3(regs) is executed in step 466.

Thus, the SJS implements a binary search to arrive at one of four cached direct calls instead of using call table 404. Though four calls are cached in the SJS, more or fewer calls can be cached. The four direct calls included in the cache are the result of learning the frequently called call table translations, as described in reference to FIG. 6 and updating the SJS as described in reference to FIG. 8.

Figure 5:
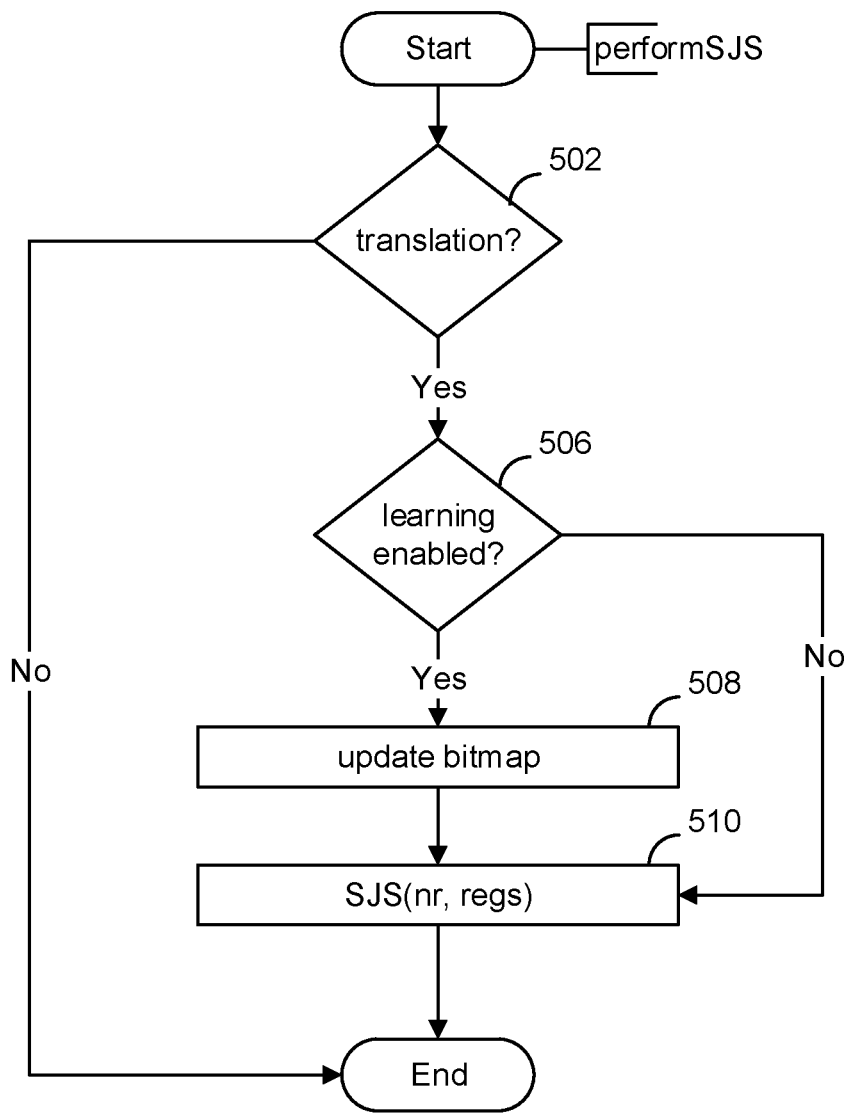
FIG. 5 depicts a flow of operations for calling the SJS, in an embodiment.

FIG. 5 depicts a flow of operations for calling the SJS, in an embodiment. In step 502, the function, perform SJS, determines whether a translation from a call table is being performed. If learning is enabled, as determined in step 506, then in step 508, bitmap 402 is updated with the current call, pointed to by the value of nr, requested from call table 404, and in step 510, the SJS, described in reference to FIG. 4B is then called with nr and regs as parameters. If learning is not enabled, the function skips step 508 and executes step 510.

Figure 6:
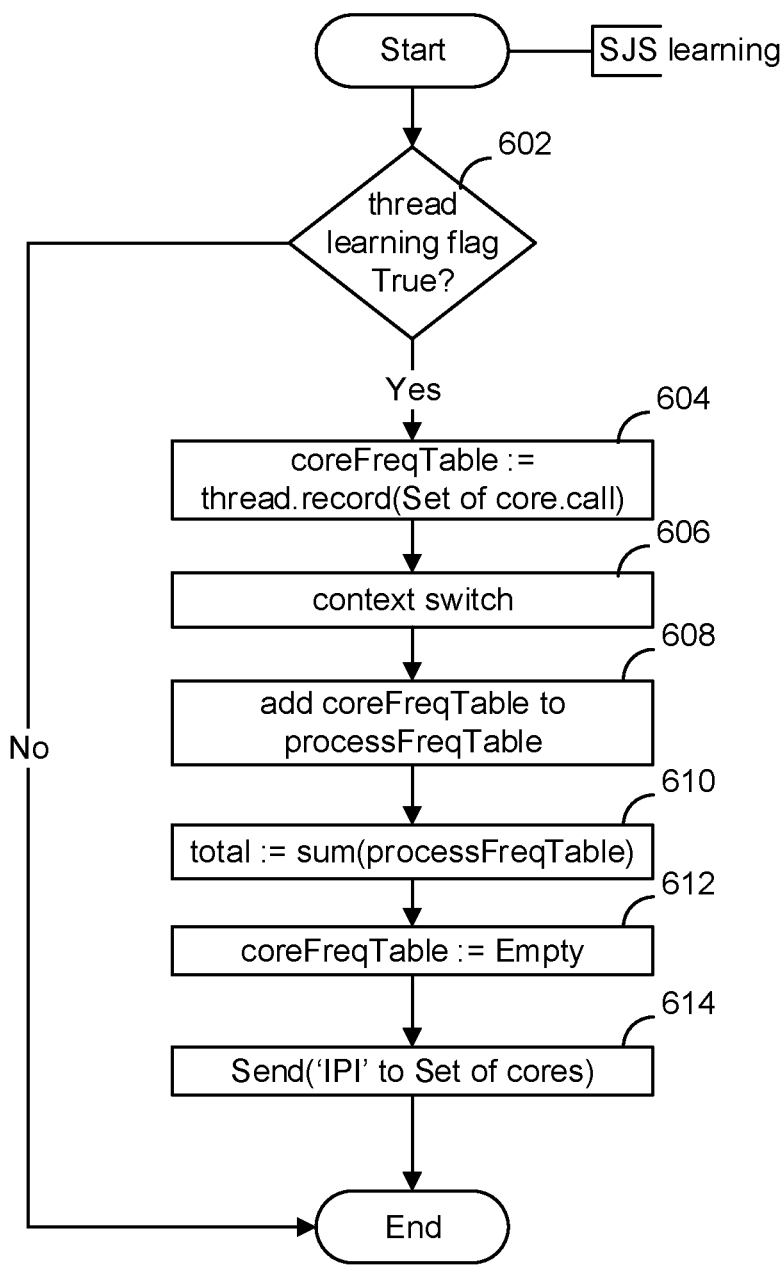
FIG. 6 depicts a flow of operations for an SJS learning function, in an embodiment.
Figure 7:
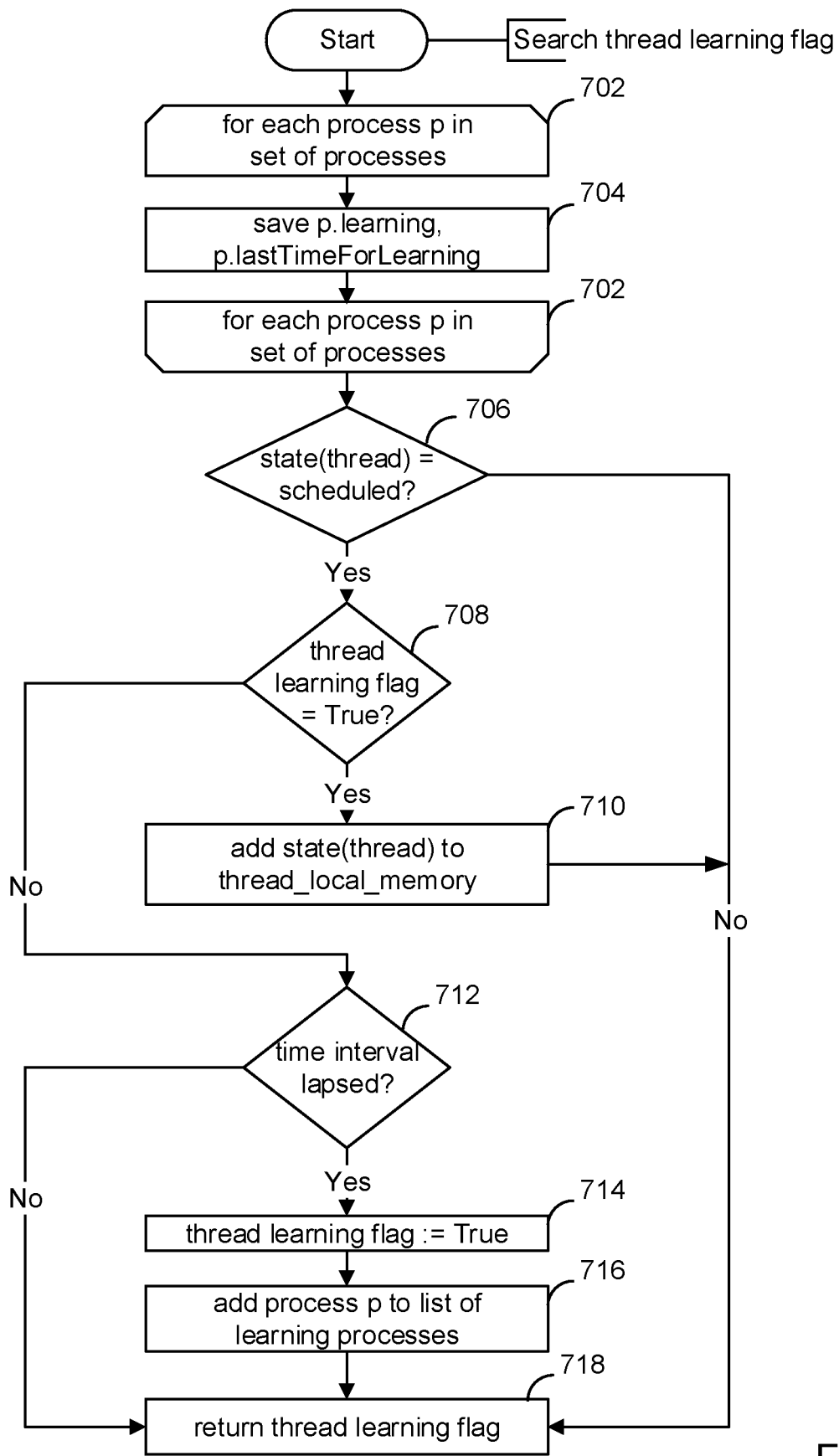
FIG. 7 depicts a flow of operations of a function for determining a state of the learning flag, in an embodiment.

FIG. 6 depicts a flow of operations for an SJS learning function, in an embodiment. In step 602, the function determines whether the learning flag is True. FIG. 7 describes in more detail how the state of the learning flag is determined. If the learning flag is True, then in step 604, the function records data regarding processor core calls that have been performed into a per-core frequency table (coreFreqTable). In step 606, the function requests a context switch and receives notice of the context switch. In step 608, after the context switch, the function adds the data from the core frequency table to a per-process frequency table (processFreqTable). In step 610, the function sums up the per-process frequency table to obtain totals for the calls per process. In step 612, the function clears the core frequency table and, in step 614, sends an interprocessor interrupt (IPI) to the execution cores that still run threads of the process to sum them up into the per-process table. In one embodiment, worker thread 112a carries out the SJS learning function.

FIG. 7 depicts a flow of operations of a function for determining a state of the learning flag, in an embodiment. In step 702, the function starts an iterator over all of the processes 104a-n that are present. In step 704, the function saves the mode of learning for each process (p.learning) and the time at which learning was last enabled for process 104a-n (p.lastTimeForLearning). In step 706, the function determines the state of the thread from thread-local memory.

If the state indicates that the thread is scheduled, then in step 708, the function determines whether the thread is in learning mode. If so, then in step 710, the function records (caches) the state of the thread (as scheduled and in learning mode) in the thread-local memory. Thereafter, the function continues to step 718, where it returns the learning flag with the value True. If the state indicates that the thread is not scheduled, then the function continues directly to step 718 where it returns the learning flag with the value equal to its current state.

If the thread is not in a learning mode as determined in step 708, then in step 712, the function determines whether a time interval has lapsed since the thread was last in a learning mode. If so, then in step 714, the function changes the learning mode of the thread to True and adds the process to the list of learning processes in step 716. If the time interval has not elapsed since the thread was last in the learning mode, then the function continues to step 718, where it returns the learning flag with the value False, as it is too soon to turn on the learning mode for the thread.

In an embodiment, worker thread 112a carries out the steps of the function of FIG. 7 to determine the state of the learning flag.

The learning mode, i.e., the mode in which steps 604-614 and steps 702-718 are performed, may be set manually or by a periodic trigger (say by a timer at 1-millisecond intervals). The learning mode may also be triggered automatically after a process starts or if a user requests that the learning mode start when the process starts. For the latter, a command by the user, such as 'echo 1>/proc/$PID/search_reset', would trigger the setting of the learning flag for the process identified by $PID so that the learning mode would start when the identified process starts. Writing to the flag wakes up the worker thread for the SJS, which then performs the steps of FIG. 6 and FIG. 7 for each process and then patches the SJS according to FIG. 8.

Figure 8:
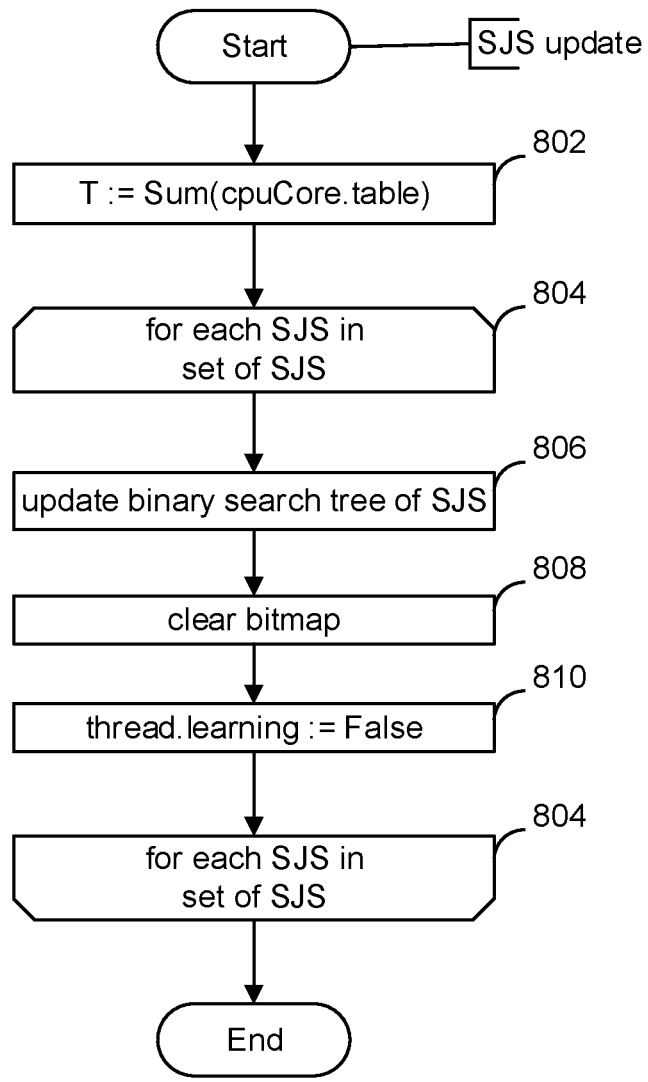
FIG. 8 depicts a flow of operations for a function that updates an SJS, in an embodiment.

FIG. 8 depicts a flow of operations for a function that updates an SJS, in an embodiment. In step 802, the function computes a sum for each of the per-CPU core frequency tables. In step 804, the function starts an iterator for SJS. In step 806, the function updates the SJS by patching in the private calls based on the sums in the tables. In step 808, the function clears the bitmap. In step 810, the function sets the learning state of the thread to False. The update function occurs after the steps of the learning mode for a process are carried out.

In addition to the learning function of FIG. 6, worker thread 112a carries out the update function of FIG. 8 and thus determines whether the SJS is in a use mode (i.e., not learning and not updating) during which the SJS is executed in response to a system call.

In one embodiment, the SJS is implemented as an instance jump switch (NJS).

Figure 9:
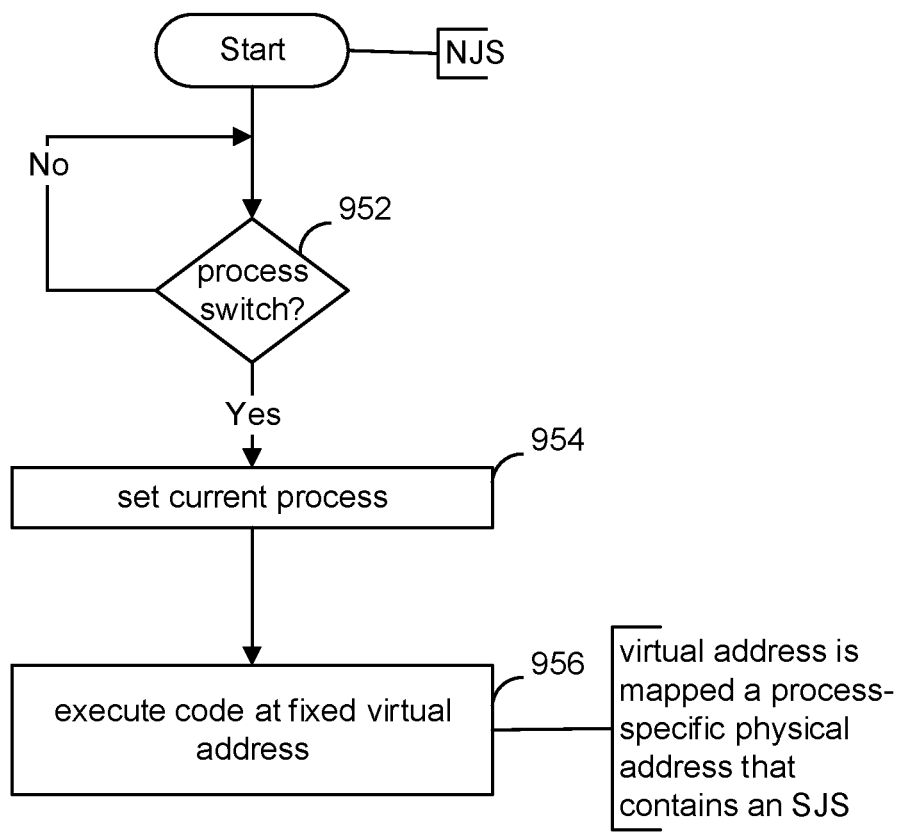
FIG. 9 depicts a flow of operations for an instance jump switch (NJS), in an embodiment.

FIG. 9 depicts a flow of operations for an instance jump switch (NJS), in an embodiment. An NJS, which is a memory region located in a code section of operating system kernel 108, correlates SJSs with a user process 104a-n. The correlation means that each user process 104a-n can have a different set of SJSs. Referring to FIG. 9, upon a process switch to one of the user processes 104a-n by operating system kernel 108 as determined by step 952, the current process is set in step 954, for the switch. In step 956, CPU 118a-n executes the contents of the virtual address, which is mapped to a process-specific address that contains an SJS. For example, if the NJS resides at virtual address 0x1000 (hexadecimal 1000), and the SJS entry is mapped at a physical address of 0x20000, then the physical address at 0x20000+(0x1000*n), where n is the process number, gives the SJS to be executed. When operating system kernel 108 switches to process n, the virtual address '1000' will then implicitly point (i.e., act as an implicit pointer) to the physical address of the SJS. Thus, by use of the NJS residing in a memory code region of operating system kernel 108, the SJS becomes a process-specific jump switch.

Modification of operating system kernel 108 source code is required for the SJS. System call dispatching in the kernel is altered to use SJS, which falls back to the system call table when the system call is not cached.

Figure 10:
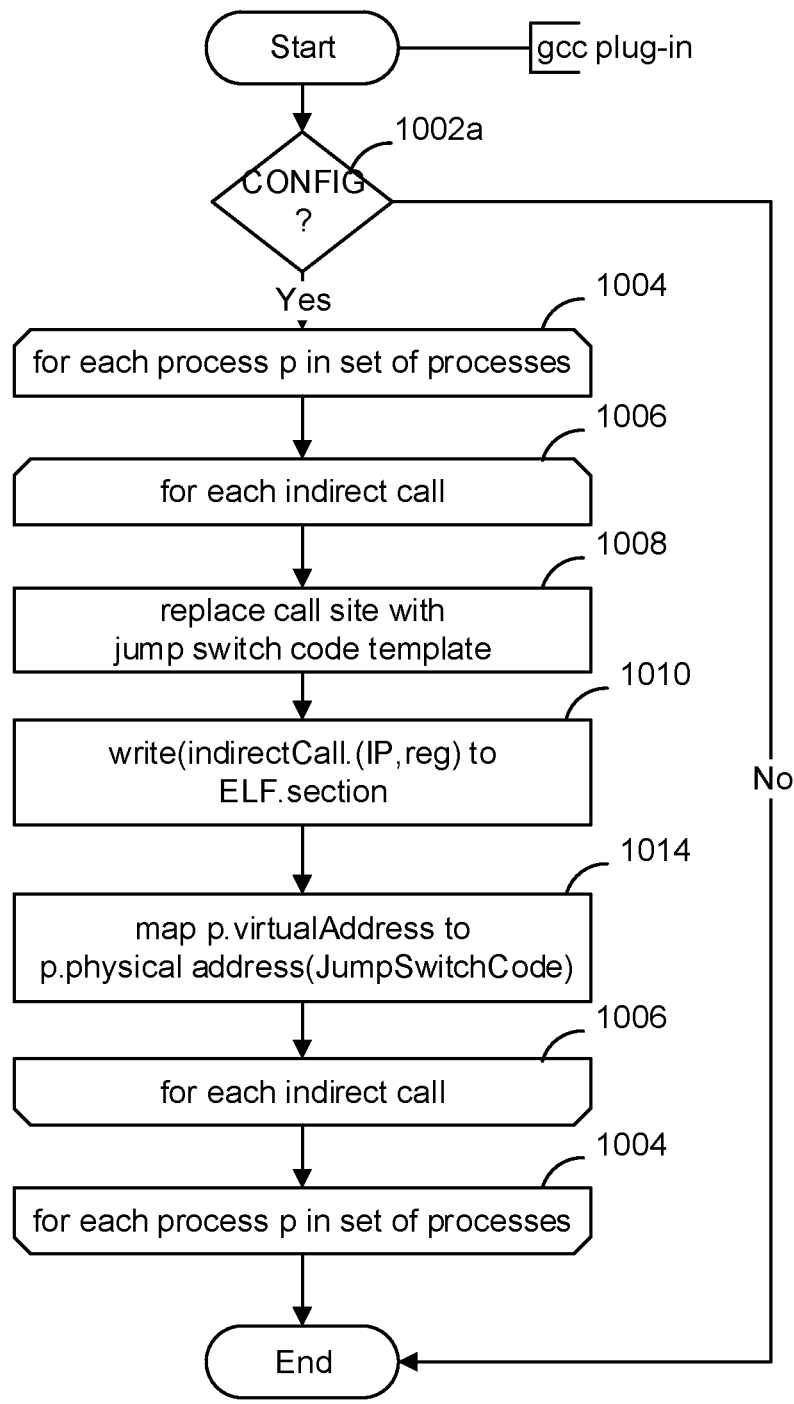
FIG. 10 depicts a flow of operations for a plug-in for an operating system compiler, in an embodiment.

FIG. 10 depicts a flow of operations for a plug-in for an operating system compiler, in an embodiment. In one embodiment, the compiler is the GNU compiler when the operating system is the Linux® operating system. The plug-in is built during a kernel build and assists in the operation of worker thread 112*a*.

Referring to FIG. 10, if a compiler build-option flag, CONFIG, is true, as determined in step 1002, then the compiler compiles operating system kernel 108 to use jump switches according to the following steps.

In step 1004, the plug-in sets up an iterator over all of user processes 104*a-n*. In step 1006, the plug-in starts an iterator over each indirect call. In step 1008, the plug-in replaces each indirect call with a jump switch code template, which contains the basic jump switch code, but with the jump switch set to execute only fallback code, which in the case of the SJS is the indirect call in the call table. In step 1010, worker thread 112*a* writes the instruction pointer (IP) and register used by the call to a new file section of a standard file format, such as an executable and linkable format (ELF) file, used by the compiler. The new section of the ELF file contains information that is read during boot of operating system kernel 108 to compose a list of calls so that worker thread 112*a* can easily recognize which register is used in each jump switch. The information also serves as a precaution to prevent worker thread 112*a* from patching the wrong code. The writing of the indirect call to the ELF section in step 1010 may be different for each process. In step 1014 of FIG. 10, the plug-in maps a virtual address of the jump switch code template in a special memory area for the process to a physical address that is different for each process. Thus, in FIG. 10, the plug-in operates on a per-process basis.

Worker thread 112*a* is integrated into operating system kernel in a manner similar to other periodic tasks which patch code such as static-keys, jump-label, and alternatives infrastructure in the Linux® operating system.

As described above, according to the embodiments, by recording the frequencies of indirect calls in a table and then updating an SJS with the most frequently used calls based on the table, the SJS dynamically adjusts to the kernel operation instead of trying to convert the large number of indirect calls in the system call table to direct calls.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of redirecting an indirect call in a call table to direct call, the method comprising:
   recording frequencies of calls in a frequency table;
   updating a search trampoline to cache, as direct calls, calls of the call table that are most frequently made according to the recorded calls in the frequency table;
   receiving a request to perform one of the calls in the call table;

performing a search of the search trampoline to determine whether or not the requested call is cached in the search trampoline;

if the requested call is cached in the search trampoline, performing the requested call that is cached in the search trampoline; and if the requested call is not cached in the search trampoline, performing the requested call by accessing the call via the call table.

2. The method of claim 1, wherein recording frequencies of calls in a table includes:

recording frequencies of calls in a per-CPU table; and aggregating the calls in the per-CPU table into a per-process table.

3. The method of claim 2, wherein aggregating the calls into the per-process table occurs when a process context switch occurs.

4. The method of claim 2, wherein a learning mode is set when a thread of a process is scheduled.

5. The method of claim 4, wherein the learning mode is set after a time interval lapses.

6. The method of claim 1, wherein the search trampoline caches four direct calls.

7. The method of claim 1, wherein the search trampoline is implemented as an instance trampoline.

8. A system comprising:

a memory containing one or more user processes, and an operating system kernel having a memory code region that has a different mapping for each user process; and one or more CPUs coupled to the memory, the one or more CPUs running the operating system kernel and the one or more user processes;

wherein the operating system kernel is configured to:

record frequencies of calls in a frequency table;

update a search trampoline to cache, as direct calls, calls of the call table that are most frequently made according to the recorded calls in the frequency table;

receive a request to perform one of the calls in the call table;

perform a search of the search trampoline to determine whether or not the requested call is cached in the search trampoline;

if the requested call is cached in the search trampoline, perform the requested call that is cached in the search trampoline; and if the requested call is not cached in the search trampoline, perform the requested call by accessing the call via the call table.

9. The system of claim 8, wherein being configured to record frequencies of calls in a table includes being configured to:

record frequencies of calls in a per-CPU table; and aggregate the calls in the per-CPU table into a per-process table.

10. The system of claim 9, wherein being configured to aggregate the calls into the per-process table includes aggregating the calls when a process context switch occurs.

11. The system of claim 9, wherein a learning mode is set when a thread of a process is scheduled.

12. The system of claim 11, wherein the learning mode is set after a time interval lapses.

13. The system of claim 8, wherein the search trampoline caches four direct calls.

14. The system of claim 8, wherein the search trampoline is implemented as an instance trampoline.

15. A non-transitory computer-readable medium comprising instructions executable in a computer system, wherein the instructions when executed in the computer system cause the computer system to carry out a method of redirecting an indirect call in a call table to a direct call, the method comprising:

recording frequencies of calls in a frequency table;

updating a search trampoline to cache, as direct calls, calls of the call table that are most frequently made according to the recorded calls in the frequency table;

receiving a request to perform one of the calls in the call table;

performing a search of the search trampoline to determine whether or not the requested call is cached in the search trampoline;

if the requested call is cached in the search trampoline, performing the requested call that is cached in the search trampoline; and if the requested call is not cached in the search trampoline, performing the requested call by accessing the call via the call table.

16. The non-transitory computer-readable medium of claim 15, wherein recording frequencies of calls in a table includes:

recording frequencies of calls in a per-CPU table; and aggregating the calls in the per-CPU table into a per-process table.

17. The non-transitory computer-readable medium of claim 16, wherein aggregating the calls into the per-process table occurs when a process context switch occurs.

18. The non-transitory computer-readable medium of claim 16, wherein a learning mode is set when a thread of a process is scheduled.

19. The non-transitory computer-readable medium of claim 18, wherein the learning mode is set after a time interval lapses.

20. The non-transitory computer-readable medium of claim 15, wherein the search trampoline is implemented as an instance trampoline.

* * * * *